US010792771B2

(12) United States Patent
Machinchick et al.

(10) Patent No.: US 10,792,771 B2
(45) Date of Patent: Oct. 6, 2020

(54) METHOD OF MAKING INTEGRALLY BLADED ROTOR

(71) Applicant: United Technologies Corporation, Farmington, CT (US)

(72) Inventors: Michael F. Machinchick, Cromwell, CT (US); Luke H. Rettberg, West Hartford, CT (US); Andrew L. Haynes, Glastonbury, CT (US); Janet M. Stanley, East Hampton, CT (US); Vasisht Venkatesh, West Hartford, CT (US); David Ulrich Furrer, Marlborough, CT (US); James R. Murdock, Tolland, CT (US); Daniel Gynther, Marlborough, CT (US); Michael J. Linden, East Haddam, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 57 days.

(21) Appl. No.: 15/702,531

(22) Filed: Sep. 12, 2017

(65) Prior Publication Data
US 2019/0076970 A1 Mar. 14, 2019

(51) Int. Cl.
*F01D 5/30* (2006.01)
*B23P 15/00* (2006.01)
(Continued)

(52) U.S. Cl.
CPC .............. *B23P 15/006* (2013.01); *C21D 1/00* (2013.01); *C22F 1/183* (2013.01); *F01D 5/286* (2013.01);
(Continued)

(58) Field of Classification Search
CPC ...... B23P 15/006; F01D 5/286; F01D 5/3061; F01D 5/34; C21D 1/00; C22F 1/183; B21K 1/36; B23K 2101/001; B23K 20/1205
See application file for complete search history.

(56) References Cited

U.S. PATENT DOCUMENTS 4,311,486 A * 1/1982 Yamada ................. C01F 7/144
23/301
4,536,932 A 8/1985 Athey
(Continued)

FOREIGN PATENT DOCUMENTS

EP 1078997 A1 2/2001
EP 1422307 A1 5/2004
(Continued)

OTHER PUBLICATIONS

Lütjering, Influence of processing on microstructure and mechanical properties of (α+β) titanium alloys, Elsevier, Materials Science and Engineering, A243, 1998, pp. 32-45.
(Continued)

*Primary Examiner* — Rick K Chang
(74) *Attorney, Agent, or Firm* — Cantor Colburn LLP

(57) ABSTRACT

Disclosed is a method of making an integrally bladed rotor. According to the method, a rotor disk comprising a radially outer rim surface is provided. A portion of the disk outer rim surface is removed, leaving a protrusion on the rotor disk outer rim surface. The disk with material removed is subjected to thermal processing. A blade comprising an airfoil and a base is positioned such that a base surface is in contact with the protrusion, and heat, pressure, and motion are applied between the blade and the disk to friction weld the base surface to the protrusion.

12 Claims, 3 Drawing Sheets

(51) Int. Cl.
*F01D 5/34* (2006.01)
*C22F 1/18* (2006.01)
*C21D 1/00* (2006.01)
*F01D 5/28* (2006.01)
*B23K 101/00* (2006.01)
*B23K 20/12* (2006.01)
*B21K 1/36* (2006.01)

(52) U.S. Cl.
CPC ............ *F01D 5/3061* (2013.01); *F01D 5/34* (2013.01); *B21K 1/36* (2013.01); *B23K 20/1205* (2013.01); *B23K 2101/001* (2018.08)

(56) References Cited

U.S. PATENT DOCUMENTS

| | | |
|---|---|---|
| 4,883,216 A | 11/1989 | Patsfall |
| 5,281,285 A | 1/1994 | Marquardt |
| 5,281,585 A | 1/1994 | Duggan et al. |
| 5,326,409 A | 7/1994 | Couts, Jr. |
| 5,678,749 A | 10/1997 | Pratt et al. |
| 6,219,916 B1 | 4/2001 | Walker et al. |
| 6,910,616 B2 * | 6/2005 | Halley ................ B23K 20/129 228/112.1 |
| 8,006,380 B2 * | 8/2011 | Rawson ............ B23K 20/1205 29/889.1 |
| 2009/0159161 A1 | 6/2009 | Wayte et al. |
| 2010/0322778 A1 | 12/2010 | Carroll, III et al. |
| 2015/0354358 A1 | 12/2015 | Grande, III et al. |
| 2016/0003058 A1 | 1/2016 | Merry et al. |
| 2017/0022827 A1 | 1/2017 | Waldman et al. |
| 2017/0268091 A1 | 9/2017 | Woodfield et al. |

FOREIGN PATENT DOCUMENTS

| | | |
|---|---|---|
| EP | 3421622 A1 | 1/2019 |
| WO | 2016025045 A2 | 2/2016 |

OTHER PUBLICATIONS

European Search Report from the European Patent Office for EP Application No. 18194038.8 dated Jan. 28, 2019, 9 pages.
European Search Report from the European Patent Office for EP Application No. 18194059.4 dated Jan. 30, 2019, 9 pages.

* cited by examiner

METHOD OF MAKING INTEGRALLY BLADED ROTOR

BACKGROUND

This disclosure is related to the field of bladed rotors generally, and more specifically to integrally bladed rotors.

Bladed rotors such as impellers, blisks, etc. are employed in gas turbines and other machines. The design, construction and materials of bladed rotors often dictate operating limits for the turbines in which they are employed. Extensive efforts have been made over the years to develop new alloys, new fabrication techniques, and new component designs which permit operation of these rotors at higher operating temperatures and/or lead to lighter weight, longer lived components, with all their attendant advantages.

The fan, turbine, and compressor sections of gas turbine engines include one or more circumferentially extending rows or stages of airfoils, commonly called rotor blades, which are axially spaced between rows or stages of fixed airfoils (stator vanes). The rotor blades are connected to and extend radially outwardly from a rotor disk. During operation the centrifugal loads generated by the rotational action of the rotor blades must be carried by the rotor disk within acceptable stress limits.

In one type of a conventional bladed rotor assembly, the rotor disk has a plurality of slots around its radially outer periphery. The blades may comprise a root, a platform, and an airfoil. The platform has opposite facing surfaces. The root attaches to the slot in the disk and the airfoil extends radially out from the disk. The slots and the roots have complementary shapes, typically either a dove tail or a fir tree. The root mates with the slot and the blade extends radially outward therefrom. This type of rotor assembly is relatively heavy because the slots are cut through the rim of the disk creating what is called a "dead rim" where the metal between the slot can pull on the disk with well over 10,000 g's and fir tree or dovetail mating structures likewise do not contribute to sustaining the disk's centrifugal load and also pulls with the same 10,000 g load, thereby necessitating that the rotor disk be sufficiently sturdy, and thus heavy, in order to accommodate the stresses resulting from the heavy blade attachment area.

Alternatively, the blades may be secured by bonding or welding, to the rotor disc to thereby form an integrally bladed rotor assembly (IBR). A major advantage of an integrally bladed rotor assembly is that there is often no need for an extended blade root or a blade platform. The airfoil may be secured directly to the radially outer periphery of the rotor disk. The absence of an extended root and a blade platform results in a blade that is lighter than a conventional blade. A lighter blade enables the use of a less rigid and lighter rotor disk, in which case the integrally bladed rotor assembly is overall much lighter than a conventional bladed rotor assembly.

BRIEF DESCRIPTION

Disclosed is a method of making an integrally bladed rotor. The method comprises providing a rotor disk comprising a radially outer rim surface. A portion of the disk outer rim surface is removed, leaving a protrusion on the rotor disk outer rim surface. The disk with material removed is subjected to thermal processing. A blade comprising an airfoil and a base is positioned such that a base surface is in contact with the protrusion, and heat, pressure, and motion are applied between the blade and the disk to friction weld the base surface to the protrusion.

In some embodiments, the method further comprises machining the thermally processed disk outer rim surface to a final shape before positioning the blade.

In any one or combination of the foregoing embodiments, the protrusion can extend in a direction between a leading edge of the disk outer rim surface to a trailing edge of the disk outer rim surface, and removing a portion of the disk outer rim surface can include removing a portion of the disk outer rim surface material along each side of the extending protrusion.

In any one or combination of the foregoing embodiments, the protrusion can be positioned corresponding to a chord of the airfoil where the airfoil meets the disk.

In any one or combination of the foregoing embodiments, the thermal processing can comprise heating the disk at or above a metal alloy solution temperature and quenching the disk to a temperature below a metal alloy solution temperature.

In any one or combination of the foregoing embodiments, the method further can comprise holding the disk at or above the metal alloy solution temperature before quenching.

In any one or combination of the foregoing embodiments, the quenching can reduce temperature at a rate of at least 100° F. per minute.

In any one or combination of the foregoing embodiments, the quenching can reduce temperature at a rate of at least 200° F. per minute.

In any one or combination of the foregoing embodiments, the quenching can reduce temperature at a rate of at least 300° F. per minute.

In any one or combination of the foregoing embodiments, the thermally processed disk can comprise a microstructure comprising primary alpha grains of less than 10 µm.

In any one or combination of the foregoing embodiments, the airfoil can be a solid contiguous structure.

In any one or combination of the foregoing embodiments, each of the blade surface and the recessed area can comprise a titanium alloy.

Also disclosed is an integrally bladed rotor made by the method of any one or combination of the foregoing embodiments.

Also disclosed is a gas turbine engine comprises an integrally bladed rotor made by the method of any one or combination of the foregoing embodiments.

In some embodiments, a gas turbine engine comprises a fan comprising an integrally bladed rotor made by the method of any one or combination of the foregoing embodiments.

BRIEF DESCRIPTION OF THE DRAWINGS

The following descriptions should not be considered limiting in any way. With reference to the accompanying drawings, in which like elements are numbered alike.

DETAILED DESCRIPTION

A detailed description of one or more embodiments of the disclosed apparatus and method are presented herein by way of exemplification and not limitation with reference to the Figures.

Figure 1:
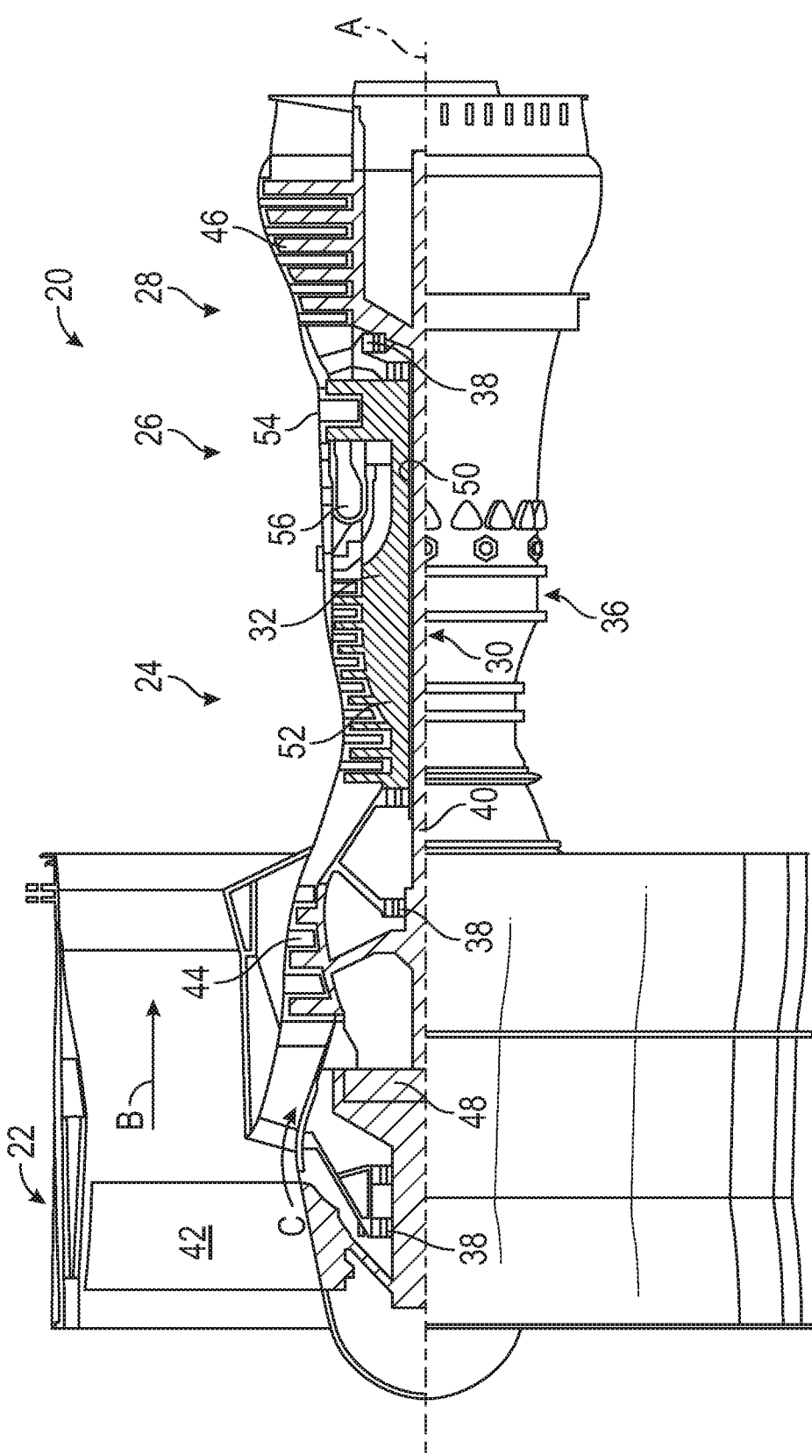
FIG. 1 is a schematic depiction of a gas turbine engine cross-section.

As mentioned above, a method is disclosed for friction welding a blade onto rotor to form an integrally bladed rotor. One application for such an integrally bladed rotor is on a gas turbine engine, for example as a bladed fan. Other applications include compressor rotors or turbine rotors. FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 m/sec).

Figure 2:
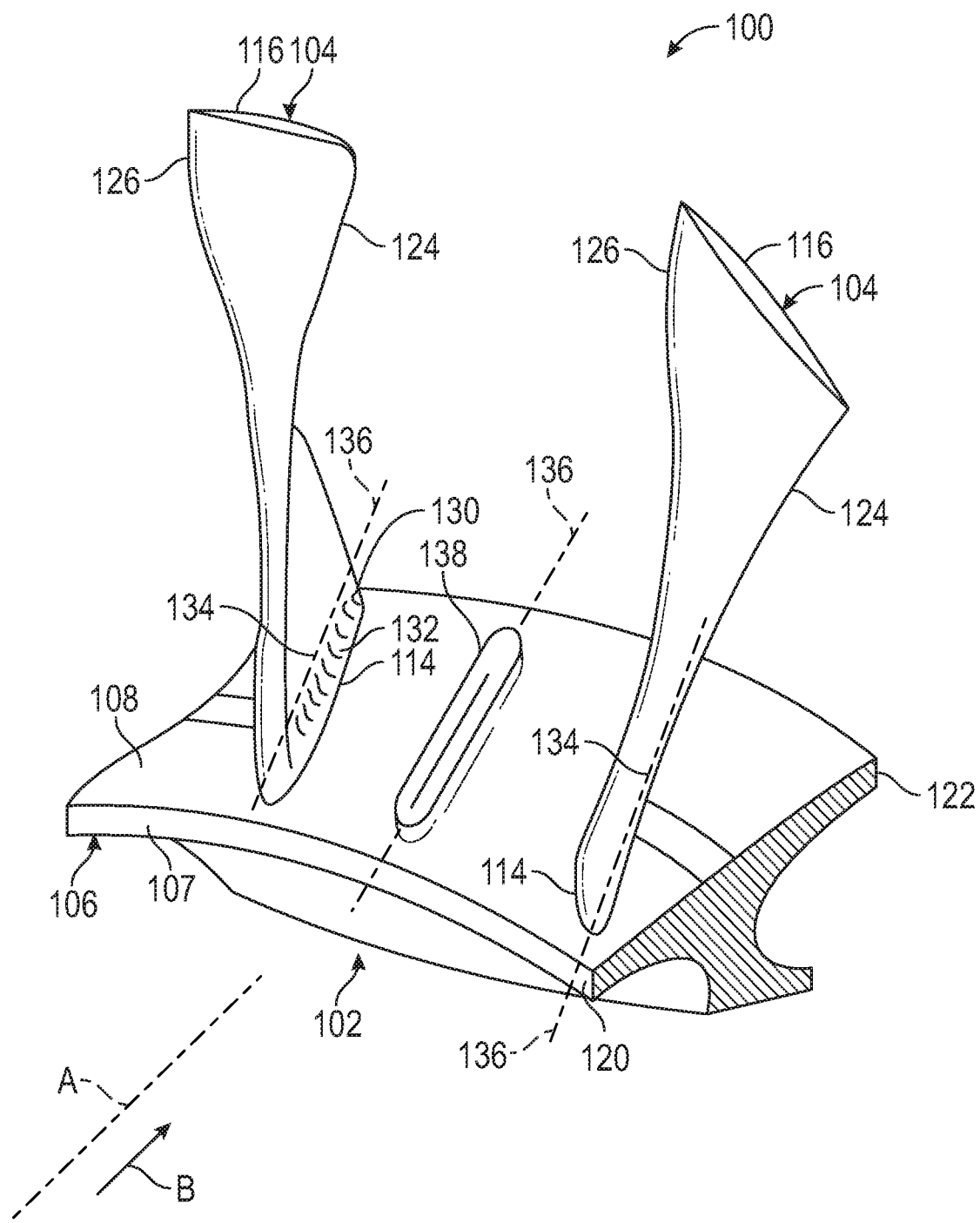
FIG. 2 is a schematic depiction of perspective view of an integrally bladed rotor disk outer rim.

With reference now to FIG. 2, a perspective view of a portion of an integrally bladed rotor 100 is schematically depicted. As shown in FIG. 2, an integrally bladed rotor 100 comprises a disk 102 and blades 104. The disk 102 has an outer rim 106 having a radially inner surface 107, and a radially outer surface 108. Each of the blades 104 includes an airfoil 116 and a base 114. The blades attach, at their bases 114, to the radially outer surface of the rim 106 and extend radially outward therefrom. It should be understood that the blades 104 are only two of a plurality of such blades attached to the disk 102. The disk further includes an upstream edge 120 and a downstream edge 122, relative to the gas flow path B (FIG. 1). The blades have upstream and downstream edges 124, 126. The integrally bladed rotor 100 typically includes a fillet 130, i.e., a curved corner having a radius, adjoining the surfaces of the airfoil and the rim. The fillet serves to reduce the concentration of stress where the airfoils attach to the rim. The fillet itself may experience high concentrations of stress at its base 132, where the surface of the fillet is tangent to the disc rim. A plurality of chords 134 each represent a chord of the base of an associated one of the airfoils, i.e. a line between the upstream edge 120 of the base of the airfoil and the downstream edge 122 of the base of the airfoil. The plurality of chords 134 are typically similarly oriented relative to the longitudinal axis A (FIG. 1). The chords each lie on an associated one of a plurality of chord lines 136 that collectively represent the desired positions of the chords relative to the disk rim.

As mentioned above, the blades 104 are welded to the disk 102 by the application of heat (e.g., heat generated by friction), pressure, and motion, such as by linear friction welding (LFW). As further shown in FIG. 2, a protrusion (also referred to as a standup) 138 extends linearly with a longitudinal axis along a chord line 136 along the surface of the rim 106 to receive a base 114 of a blade 104. The welding can be initiated by positioning a blade base 114 (not shown in FIG. 3 for purposes of illustrating the standup 138) aligned with and in contact with the standup 138. Linear friction welding begins by applying compressive and oscillatory forces to the blade base 114. The compressive forces can be directed roughly perpendicular to the surface of the disk rim 106. The oscillatory forces 136 are directed along an axis roughly parallel to the longitudinal axis of the standup 138. These forces effectively place the interface between the base and standup under high pressure and cause the base to oscillate back and forth relative to the rim. At the interface, frictional heat is generated and material from each part changes to a plastic state. Some of this material flows out, in the form of flash, from between the parts, resulting in gradual decrease in the thickness of the parts. Eventually, the interface comprises substantially all points on the opposing surfaces such that the base surface and the standup surface are substantially contiguous. When the process is terminated, the remaining plastic state material of each part cools and changes back to solid state, forming bonds therein and bonding the two parts together. At the conclusion of the processing, the surface of the base and the recessed surface are substantially contiguous over the area of the recessed surface, and the weld between the base and the rim is therefore also substantially continuous.

Figure 3:
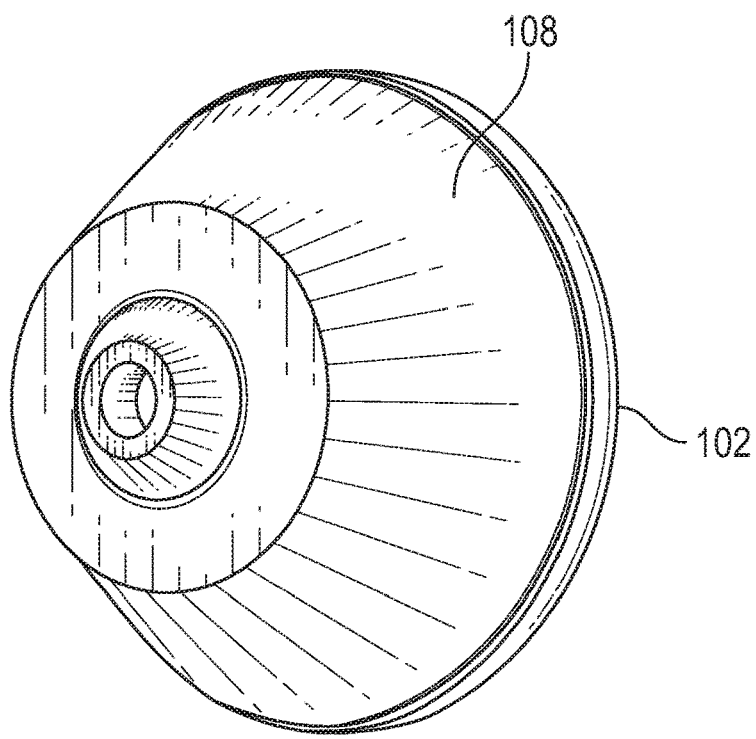
FIG. 3 is a schematic depiction of a perspective view of rotor disk during fabrication of an integrally bladed rotor disk outer rim prior to removal of material from the disk outer rim.
Figure 4:
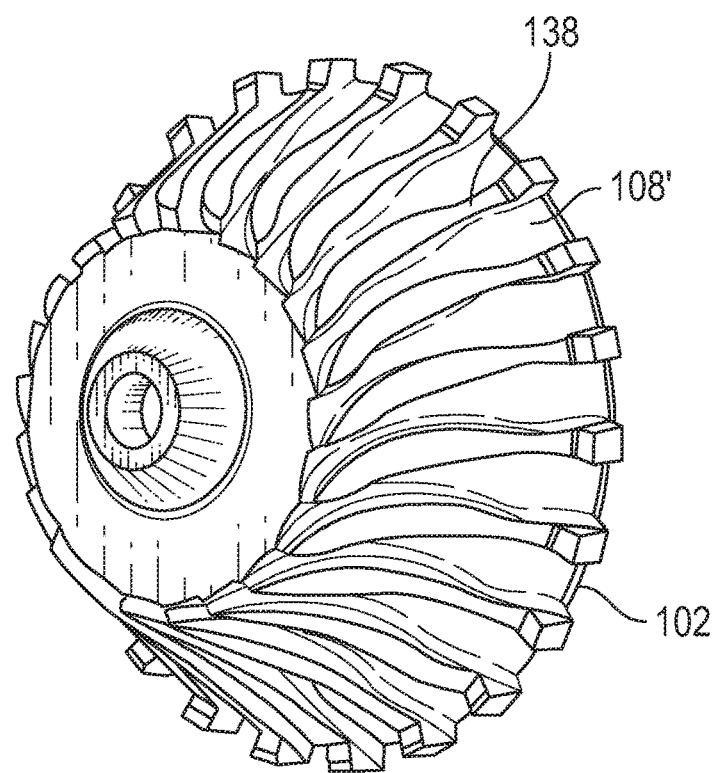
FIG. 4 is a schematic depiction of a perspective view of rotor disk during fabrication of an integrally bladed rotor disk outer rim after removal of material from the disk outer rim before thermal processing.

As mentioned above, a portion or portions of the disk outer rim surface are removed, leaving a protrusion or a number of protrusions on the disk outer rim surface. An example embodiment of a rotor disk 102 having a disk outer surface 108 before removal of material is schematically shown in a perspective view in FIG. 3. The rotor disk 102 as shown in FIG. 3 can be formed from a metal billet such as a titanium alloy in a forging press at a forging temperature. In some embodiments, the metal billet and the rotor disk can be formed according to methods disclosed in U.S. patent application Ser. No. 15/702,486 entitled "Process of Making Integrally Bladed Rotor", filed on even date herewith, the disclosure of which is incorporated herein by reference in its entirety. FIG. 4 shows the rotor disk 102 after material removal, in which material has been removed from the disk outer rim surface in areas 108', leaving protrusions or standups 138. Material can be removed using various process such as conventional milling, electro-chemical milling, flank milling, electrode discharge machining, broaching, grinding. In some embodiments, the material removal performed prior to thermal processing can leave protrusions that are in net shape or near net shape to serve as standups on which to friction weld the blades 104. In some embodiments, the material removal performed prior to thermal processing can expose new portions of the disk to the effects of the subsequently performed thermal processing while leaving additional material removal to be performed after thermal processing to achieve net shape or near net shape. In either case, a final machining step (e.g., using any of the above-mentioned material removal techniques) can be used to provide precision shaping.

A disk rotor with material removed from the outer rim surface such as shown in FIG. 4 can then be subjected to thermal processing. Thermal processing generally involves increasing and reducing the temperature of the metal according to a protocol. In some embodiments, for example, the thermal processing can include raising the temperature, holding the temperature at an elevated temperature, and then cooling. In some embodiments, the hold time at elevated temperature (also called a soak or soak time) can be in a range with a lower end of 10 minutes, or 30 minutes, or 1 hour, and an upper end of to 2 hours, or 3 hours, or 4 hours. These range endpoints can be independently combined to form a number of different ranges, and each possible combination of range endpoints is hereby expressly disclosed. In some embodiments, the elevated temperature can be at or above a solution temperature of the metal. As used herein, the term "solution temperature" means a temperature at which one or more constituents of the metal alloy form part of a solid solution. In some embodiments such as for titanium alloys, the elevated temperature can be in a range having a lower end of 75° F. below beta field transition temperature (i.e., beta transus temperature), or 70° F. below beta transus temperature, or 65° F. below beta transus temperature, and an upper end of 30° F. below beta field transition temperature, or 25° F. below beta transus temperature, or 20° F. below beta transus temperature. These range endpoints can be independently combined to form a number of different ranges, and each possible combination of range endpoints is hereby expressly disclosed. As used herein, the beta field transition or beta transus temperature is the lowest temperature at which the alloy can exist in a 100% beta phase.

In some embodiments, the cooling can be performed rapidly (also known as quenching). Although this disclosure is not bound by any theory of operation, it is believed that a rapid reduction in temperature can lead to the formation of beneficial grain microstructures in the metal. In some embodiments, temperature reduction occurs at a rate of at least 100° F./minute, or at least 200° F./minute, or at least 300° F./. In some embodiments, the temperature reduction rate can be in a range with a lower end of 300° F./minute, or 200° F./minute, or 300° F., and an upper end of to 700° F./minute, or 850° F./minute, or 1000° F. These range endpoints can be independently combined to form a number of different ranges, and each possible combination of range endpoints is hereby expressly disclosed. In some embodiments, the above cooling rate can be maintained during a transition from the soak temperature down to a temperature of 1100° F. In some embodiments, a resultant metal grain structure can include microstructure with fine primary grain size less than 10 um with a volume fraction of 15-50%, and a widmanstatten secondary alpha (<1.0 um). In some embodiments, the metal grain structure can include microstructure with a low volume fraction of primary alpha (<30%) grains.

Various materials can be used for the blade base and disk rim. In some embodiments, both the base and the rim comprise nickel alloys, which can be the same alloy for both parts or different alloys. For example, in some embodiments, the blade can be formed from an alloy such as PWA 1228 or equivalent and the disk can be formed from an alloy such as PWA 1215, PWA 1214, or equivalent. In some embodiments, the blade and the base can be formed from the same material, such as PWA 1215 or equivalent.

In some embodiments, the embodiments described herein can provide a technical effect promoting metal grain microstructures for a robust integrally bladed rotor structure. The formation of protrusions or standups on a disk rim for friction welding attachment of blades can provide benefits such as ease of fabrication and promoting ejection or removal of flash from the weld zone. However, it has now been discovered that the machining away of metal from the disk rim to form the standups can remove superior metal with fine grain structure properties which tends to exist in disk outer diameter areas, exposing coarser grain material that is less resistant to stress from vibration. This stress can be particularly severe with some designs such as solid (as opposed to hollow) fan blades. Thermal processing of the rotor disk after the material removal can provide a technical effect of providing target surface(s) on the disk outer rim for blade attachment through friction welding while also promoting formation of a region of fine grain structure metal in the integrally bladed rotor structure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of making an integrally bladed rotor, comprising providing a rotor disk comprising a radially outer rim surface free from blades;
   removing a portion of the disk outer rim surface, leaving a protrusion on the rotor disk outer rim surface;
   subjecting the disk including said protrusion to thermal processing;
   positioning a blade comprising an airfoil and a base such that a base surface is in contact with the thermally processed protrusion; and
   applying heat, pressure, and motion between the blade and the disk to friction weld the base surface to the protrusion.

2. The method of claim 1, further comprising machining the thermally processed disk outer rim surface to a final shape before positioning the blade.

3. The method of claim 1, wherein the protrusion extends in a direction between a leading edge of the disk outer rim surface to a trailing edge of the disk outer rim surface, and removing a portion of the disk outer rim surface includes removing a portion of the disk outer rim surface material along each side of the extending protrusion.

4. The method of claim 3, wherein the protrusion is positioned corresponding to a chord of the airfoil where the airfoil meets the disk.

5. The method of claim 1, wherein the disk comprises a metal alloy, and the thermal processing comprises heating the disk at or above a solution temperature of the metal alloy and quenching the disk to a temperature below the solution temperature of the metal alloy.

6. The method of claim 5, further comprising holding the disk at or above the solution temperature of the metal alloy before quenching.

7. The method of claim 5, wherein the quenching reduces temperature at a rate of at least 100° F. per minute.

8. The method of claim 5, wherein the quenching reduces temperature at a rate of at least 200° F. per minute.

9. The method of claim 5, wherein the quenching reduces temperature at a rate of at least 300° F. per minute.

10. The method of claim 1, wherein the thermally processed disk comprises a microstructure comprising primary alpha grains of less than 10 μm.

11. The method of claim 1, wherein the airfoil is a solid contiguous structure.

12. The method of claim 1, wherein each of the blade and the disk comprises a titanium alloy.

* * * * *